United States Patent
Lee

(10) Patent No.: US 9,214,291 B2
(45) Date of Patent: Dec. 15, 2015

(54) TOUCH PANEL AND METHOD OF MANUFACTURING THE SAME

(71) Applicant: LG INNOTEK CO., LTD., Seoul (KR)

(72) Inventor: Keun Sik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 208 days.

(21) Appl. No.: 13/930,499

(22) Filed: Jun. 28, 2013

(65) Prior Publication Data

US 2014/0001019 A1    Jan. 2, 2014

(30) Foreign Application Priority Data

Jun. 29, 2012    (KR) .................. 10-2012-0071437

(51) Int. Cl.
*H01H 1/64* (2006.01)
*G06F 3/041* (2006.01)

(52) U.S. Cl.
CPC ............ *H01H 1/64* (2013.01); *G06F 3/041* (2013.01); *G06F 2203/04103* (2013.01)

(58) Field of Classification Search
CPC ........................................................ H01H 1/64
USPC ................................. 200/302.2; 174/72 R
See application file for complete search history.

(56) References Cited

U.S. PATENT DOCUMENTS

| | | | |
|---|---|---|---|
| 2007/0122928 A1* | 5/2007 | Hayashi ..................... | 438/48 |
| 2008/0171193 A1 | 7/2008 | Yi et al. | |
| 2010/0304013 A1 | 12/2010 | Wang | |
| 2011/0226726 A1 | 9/2011 | Song et al. | |
| 2011/0287233 A1* | 11/2011 | Ma et al. .................... | 428/195.1 |
| 2012/0139871 A1* | 6/2012 | Ku et al. .................... | 345/174 |
| 2012/0154323 A1* | 6/2012 | Nambu ...................... | 345/174 |
| 2012/0202027 A1* | 8/2012 | Kim et al. ................. | 428/212 |
| 2012/0202077 A1 | 8/2012 | Kim et al. | |
| 2013/0063393 A1 | 3/2013 | Kurishima et al. | |

FOREIGN PATENT DOCUMENTS

| | | |
|---|---|---|
| KR | 10-2007-0109765 A | 11/2007 |
| KR | 10-2008-0067817 A | 7/2008 |
| KR | 10-1096559 B1 | 12/2011 |
| KR | 101311407 * | 9/2013 |
| TW | 201120705 A | 6/2011 |
| TW | 201127623 A | 8/2011 |
| TW | 201139152 A | 11/2011 |
| TW | 201224905 A | 6/2012 |

OTHER PUBLICATIONS

Office Action dated Dec. 5, 2014 in Taiwanese Application No. 102121579.
Office Action dated Sep. 30, 2013 in Korean Application No. 10-2012-0071437.

* cited by examiner

*Primary Examiner* — Timothy Thompson
*Assistant Examiner* — Charles Pizzuto
(74) *Attorney, Agent, or Firm* — Saliwanchik, Lloyd & Eisenschenk

(57) ABSTRACT

Disclosed are a touch panel and a method of manufacturing the same. The touch panel includes a gas generation layer; a sensing electrode pattern on the gas generation layer; a gas blocking layer between the gas generation layer and the sensing electrode pattern to block a gas generated from the gas generation layer.

13 Claims, 2 Drawing Sheets

TOUCH PANEL AND METHOD OF MANUFACTURING THE SAME

CROSS-REFERENCE TO RELATED APPLICATION

This application claims the benefit under 35 U.S.C. §119 of Korean Patent Application No. 10-2012-0071437, filed Jun. 29, 2012, which is hereby incorporated by reference in its entirety.

BACKGROUND

The disclosure relates to a touch panel and a method of manufacturing the same. In more particular, the disclosure relates to a touch panel capable of solving the problem of quality deterioration due to the gas generated from the touch panel, and a method of manufacturing the same.

A touch panel including an input unit (pointing device) has been extensively used in displays of electronic devices such as personal digital assistants (PDA), a notebook computer, office automation (OA) device, a medical device, or an automobile navigation system. For example, the touch panel including a capacitive touch panel as well as a resistive touch panel, an electromagnetic induction touch panel, and an optical touch panel is generally known, and recently, the capacitive touch panel has been extensively used.

FIG. 1 is a view showing a touch panel according to the related art.

As shown in FIG. 1, the touch panel according to the related art includes a plurality of first sensing electrode patterns 131 and a second sensing electrode pattern 132 formed on a substrate 110.

An insulation part 50 is formed on the second sensing electrode pattern 132 and a bridge electrode 90 is formed on the insulation part 50, such that the first sensing electrode patterns 131 spaced apart from one another are electrically connected to one another.

However, according to the related art, a gas is generated from the insulation part 50, so that the optical and electrical properties of the transparent bridge electrode 90 are deteriorated.

In addition, various materials are used according to the structure of the touch panel according to the related art, so that gases are generated from the materials, thereby deteriorating the optical and electrical properties of the sensing electrode patterns 131 and 132 or the bridge electrode 90.

BRIEF SUMMARY

The disclosure provides a touch panel which includes a separated gas blocking layer for blocking the gases generated from a touch panel substrate, a printed pattern or an insulation part so that the problems of the optical and electrical properties caused in a sensing electrode pattern or a bridge electrode formed of a transparent material are inhibited, thereby ensuring the quality of the touch panel and minimizing the defective rate.

According to one embodiment, there is provided a touch panel including a gas generation layer; a sensing electrode pattern on the gas generation layer; a gas blocking layer between the gas generation layer and the sensing electrode pattern to block a gas generated from the gas generation layer.

The gas generation layer includes one of PET (polyethylene terephthalate resin), PC (polycarbonate), PMMA (polymethyl methacrylate), TAC (triacetate cellulose) and PES (polyether sulfone).

The gas generation layer includes a printed pattern formed on glass.

The printed pattern includes an organic material or a mesoporous material.

According to another embodiment, there is provided a touch panel including a plurality of first sensing electrode patterns on a substrate; a plurality of second sensing electrode patterns on the substrate; an insulation part on the second sensing electrode patterns; a bridge electrode on the insulation part to electrically connect the first sensing electrode patterns to each other; and a gas blocking layer between the insulation part and the bridge electrode to block gas from the insulation part.

The gas blocking layer covers the first sensing electrode patterns, the second sensing electrode patterns and the insulation part.

According to still another embodiment, there is provided a touch panel including a bridge electrode on a substrate; an insulation part on the bridge electrode; a gas blocking layer on the insulation part to block gas from the insulation part; and a plurality of sensing electrode patterns formed on the gas blocking layer such that the sensing electrode patterns are electrically connected to each other through the bridge electrode.

The gas blocking layer covers the bridge electrode and the insulation part.

The gas blocking layer includes at least one of ITO (Indium-tin oxide), IZO (Indium Zinc Oxide), ZnO (Zinc Oxide), CNT (carbon nanotube), graphene, and an Ag NW (silver nano-wire).

The gas blocking layer includes an oxide material or a nitride material including at least one of Si, Nb, Si, Al, Hf, Zr, TiO, Ta and Zn.

The gas blocking layer has a thickness of 100 nm or less.

The substrate includes tempered glass, heat strengthened glass, sodalime glass or reinforced plastic.

The insulation part comprises OCA (Optically Clear Adhesive).

According to still another embodiment, there is provided a method of manufacturing a touch panel. The method includes: forming a plurality of first sensing electrode patterns on a substrate; forming a plurality of second sensing electrode patterns on the substrate; forming an insulation part on the second sensing electrode patterns; forming a bridge electrode on the insulation part to electrically connect the first sensing electrode patterns to each other; and forming a gas blocking layer between the insulation part and the bridge electrode to block gas from the insulation part.

The gas blocking layer covers the first sensing electrode patterns, the second sensing electrode patterns and the insulation part.

According to the embodiments, the gas generated from the touch panel substrate, the printed pattern, and the insulation part can be blocked by the separated gas blocking layer, so that the degradation of optical or electrical property caused in the sensing electrode pattern or the bridge electrode formed of the transparent material can be inhibited.

According to the embodiments, the optical property of the touch panel can be improved so that the visibility can be enhanced. Further, the quality of the touch panel can be ensured so that the defective rate can be minimized.

DETAILED DESCRIPTION

Figure 1:
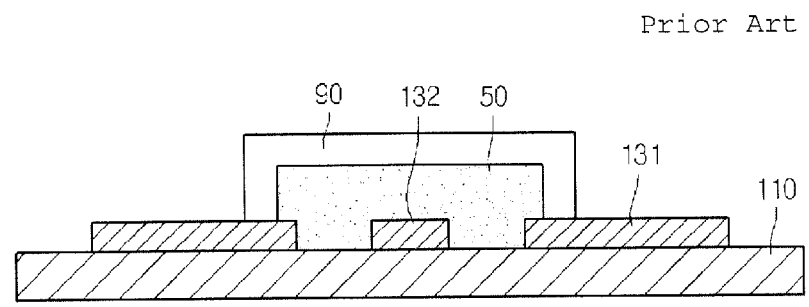
FIG. 1 is a view showing a touch panel according to the related art.

Hereinafter, the embodiment will be described with reference to accompanying drawings in detail. Detailed descriptions of well-known functions and structures incorporated herein may be omitted when they make the subject matter rather unclear. The size of the elements shown in the drawings may be exaggerated for the purpose of explanation and may not utterly reflect the actual size.

Figure 2:
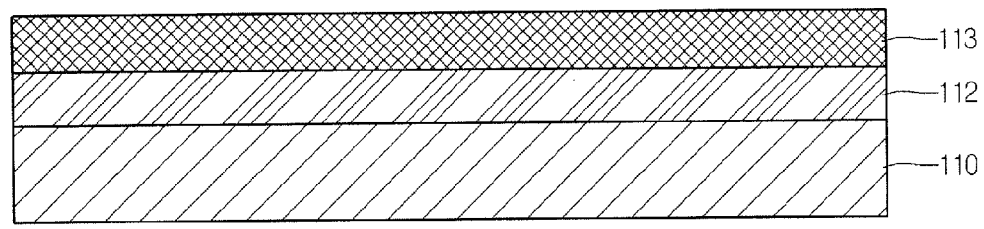
FIG. 2 is a sectional view showing a touch panel according to an embodiment.

FIG. 2 is a sectional view showing a touch panel according to an embodiment.

As shown in FIG. 2, the touch panel according to the embodiment includes a gas blocking layer 112 formed on a gas generation layer 110.

The gas generation layer 110 includes a plastic substrate and an organic or porous material so that a gas is generated therefrom. Meanwhile, when the gas generation layer 110 includes the plastic substrate, the gas generation layer 110 may include one of PET (polyethylene terephthalate resin), PC (polycarbonate), PMMA (polymethyl methacrylate), TAC (triacetate cellulose) and PES (polyether sulfone).

The sensing electrode pattern 113 is formed on the gas blocking layer 112.

The gas blocking layer 112 may be formed by using a material similar to the sensing electrode pattern 113 formed of a transparent material. The gas blocking layer 112 may include at least one of ITO (Indium-tin oxide), IZO (Indium Zinc Oxide), ZnO (Zinc Oxide), CNT (carbon nanotube), graphene, and an Ag NW (silver nano-wire). Further, the gas blocking layer 112 may have a thickness of 100 nm or less.

As described above, when the gas blocking layer 112 is formed on the gas generation layer 110, since the gas generated from the gas generation layer 110 is blocked even if the sensing electrode pattern 113 is formed by using a vacuum deposition scheme, the degradation of optical or electrical property in the sensing electrode pattern 113 formed of a transparent material may be inhibited.

Figure 3:
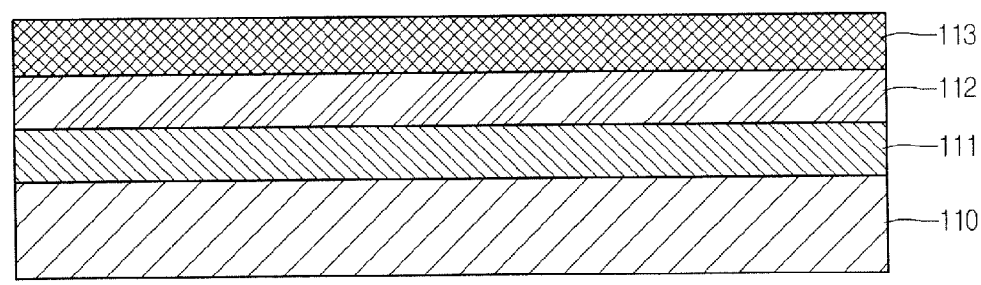
FIG. 3 is a sectional view showing a touch panel according to another embodiment.

FIG. 3 is a sectional view showing a touch panel according to another embodiment. The touch panel according to another embodiment will be described with reference to FIG. 3.

As shown in FIG. 3, the touch panel according to another embodiment includes a printed pattern 111 on the glass substrate 110.

The printed pattern 111 is formed on an inactive region of the touch panel. As the inactive region according to the embodiment is a concept opposite to an active region into which a touch instruction may be input, even if the inactive region is touched, the inactive region is not active so that an input of a touch instruction is not performed therein.

In this case, the printed pattern 111 is formed by using an ink of an organic material or a mesoporous material. The glass substrate 110 includes one of tempered glass, heat strengthened glass, sodalime glass and reinforced plastic.

According to the embodiment, the gas blocking layer 112 is formed on the printed pattern 111 and the sensing electrode pattern 113 is formed on the gas blocking layer 112. The gas blocking layer 112 may be formed of a material similar to that of the transparent sensing electrode pattern 113. For example, the gas blocking layer 112 may be formed of at least one of ITO (Indium-tin oxide), IZO (Indium Zinc Oxide), ZnO (Zinc Oxide), CNT (carbon nanotube), graphene, and an Ag NW (silver nano-wire).

As described above, when the gas blocking layer 112 is formed on the gas generation layer 110, since the gas generated from the glass substrate 110 and the printed pattern 111 is blocked even if the sensing electrode pattern 113 is formed by using a vacuum deposition scheme, the degradation of optical or electrical property in the sensing electrode pattern 113 formed of a transparent material may be inhibited.

The gas blocking layer 112 may be formed of a material similar to a transparent material of which the sensing electrode pattern 113 is formed. For example, the gas blocking layer 112 may be formed of at least one of ITO (Indium-tin oxide), IZO (Indium Zinc Oxide), ZnO (Zinc Oxide), CNT (carbon nanotube), graphene, and an Ag NW (silver nano-wire). Further, the gas blocking layer 112 has a thickness of 100 nm or less.

Figure 4:
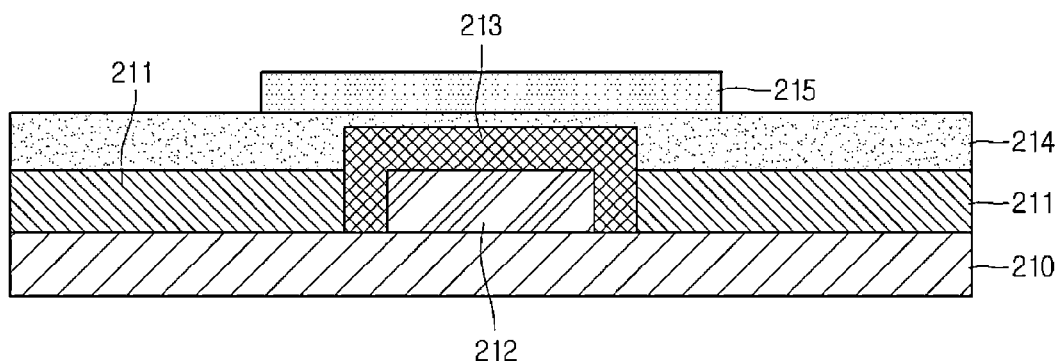
FIG. 4 is a sectional view showing a touch panel according to still another embodiment.

FIG. 4 is a sectional view showing a touch panel according to still another embodiment. The touch panel according to still another embodiment will be described with reference to FIG. 4.

As shown in FIG. 4, the touch panel includes a substrate 210 on which a plurality of first sensing electrode patterns 211 and a second sensing electrode pattern 212 are formed. The substrate 210 may be formed of tempered glass, heat strengthened glass, sodalime glass or reinforced plastic.

An insulation part 213 including OCA (Optically Clear Adhesive) may be formed on the second sensing electrode pattern 212.

A gas blocking layer 214 is formed on the insulation part 213. In more detail, the gas blocking layer 214 is formed to cover the first sensing electrode patterns 211, the second sensing electrode pattern 212 and the insulation part 213.

A bridge electrode 215 is formed on the gas blocking layer 214 which is formed to cover the insulation part 213, such that the bridge electrode 215 connects the plurality of first sensing electrode patterns 211 to each other.

That is, the gas blocking layer 214 blocks the gas generated from the insulation part 213, so that the degradation of optical or electrical property caused in the bridge electrode 215 may be inhibited.

Meanwhile, the gas blocking layer 214 is formed of an oxide or nitride material including one of Si, Nb, Si, Al, Hf, Zr, TiO, Ta and Zn through a vacuum deposition scheme and has a thickness of 100 nm or less, so that an electrical short circuit between the first sensing electrode patterns 211 and the bridge electrode 215 is inhibited.

Figure 5:
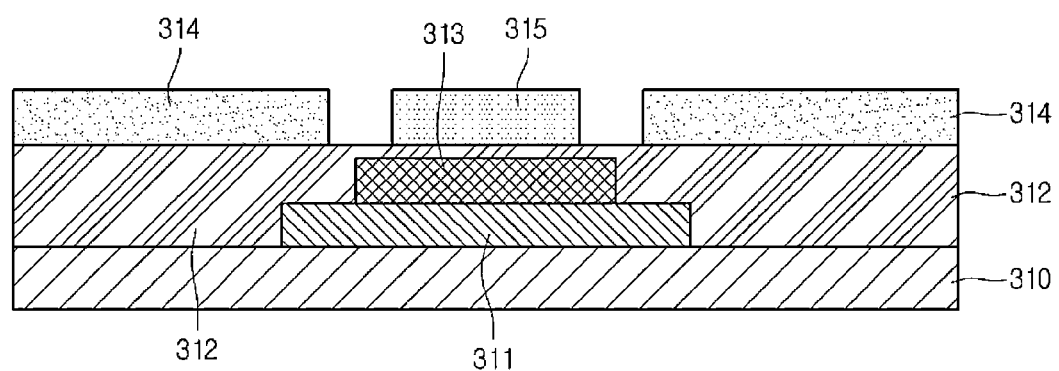
FIG. 5 is a sectional view showing a touch panel according to still another embodiment.

FIG. 5 is a sectional view showing a touch panel according to still another embodiment. The touch panel according to another embodiment will be described with reference to FIG. 5.

As shown in FIG. 5, the touch panel includes a substrate 310 on which a bridge electrode 311 is formed. The substrate 310 may be formed of tempered glass, heat strengthened glass, sodalime glass or reinforced plastic.

An insulation part 313 including OCA (Optically Clear Adhesive) may be formed on the bridge electrode 311.

A gas blocking layer 312 is formed on the insulation part 313. In more detail, the gas blocking layer 312 is formed to cover the bridge electrode 311 and the insulation part 313.

A plurality of first sensing electrode patterns 314, which are electrically connected to each other through the bridge electrode 311, and a second sensing electrode pattern 315 are formed on the insulation part 313.

That is, the gas blocking layer 312 blocks the gas generated from the insulation part 313, so that the degradation of optical or electrical property caused in the first sensing electrode patterns 314 and the second sensing electrode pattern 315 due to the gas may be inhibited.

Meanwhile, the gas blocking layer 312 is formed of an oxide or nitride material including one of Si, Nb, Si, Al, Hf, Zr, TiO, Ta and Zn through a vacuum deposition scheme and has a thickness of 100 nm or less, so that an electrical short circuit between the first sensing electrode patterns 314 and the bridge electrode 311 is inhibited.

Hereinafter, a method of manufacturing a touch panel according to an embodiment will be described with reference to FIG. 2.

As shown in FIG. 2, in order to manufacture the touch panel according to an embodiment, the gas blocking layer 112 is formed on the gas generation layer 110 and the sensing electrode pattern 113 is formed on the gas blocking layer 112.

If the gas blocking layer 112 is formed on the gas generation layer 110, the gas generated from the substrate 110 is blocked when the sensing electrode pattern 113 is formed through a vacuum deposition scheme so that the degradation of optical or electrical property caused in the sensing electrode pattern 113 formed of a transparent material may be inhibited.

Further, the method of manufacturing a touch panel according to another embodiment will be described with reference to FIG. 3.

As shown in FIG. 3, in order to manufacture the touch panel according to an embodiment, the printed pattern 111 is formed on the glass substrate 110.

According to the embodiment, the gas blocking layer 112 is formed on the printed pattern 111 formed and the sensing electrode pattern 113 is formed on the gas blocking layer 112, as described above.

When the sensing electrode pattern 113 is formed through a vacuumed deposition scheme after the gas blocking layer 112 is formed on the glass substrate 110 and the printed pattern 111, the gas generated from the glass substrate 110 and the printed pattern 111 is blocked so that the degradation of optical or electrical property caused in the sensing electrode pattern 113 formed of a transparent material may be inhibited.

Further, the method of manufacturing a touch panel according to still another embodiment will be described with reference to FIG. 4.

As shown in FIG. 4, in order to manufacture the touch panel according to an embodiment, the first sensing electrode patterns 211 and the second sensing electrode pattern 212 are formed on the substrate 210 and the insulation part 213 is formed on the second sensing electrode pattern 212.

The gas blocking layer 214 is formed on the insulation part 213 such that the gas blocking layer 214 is formed to cover the first sensing electrode patterns 211, the second sensing electrode pattern 212 and the insulation part 213. The gas blocking layer 214 is formed to have a thickness of 100 nm or less, such that the electrical short circuit between the first sensing electrode patterns 211 and the bridge electrode 215 is inhibited.

The bridge electrode 215 is formed on the gas blocking layer 214 formed to cover the insulation part 213, so that the plurality of first sensing electrode patterns 211 are electrically connected to each other.

That is, the gas generated from the insulation part 213 is blocked by the gas blocking layer 214, so that the degradation of optical or electrical property caused in the bridge electrode 215 may be inhibited.

The method of manufacturing a touch panel according to still another embodiment will be described with reference to FIG. 5.

As shown in FIG. 5, in order to manufacture the touch panel according to an embodiment, the bridge electrode 311 is formed on the substrate 310 and the insulation part 313 is formed on the bridge electrode 311.

The gas blocking layer 312 is formed on the insulation part 313. In this case, the gas blocking layer 312 is formed to cover the bridge electrode 311 and the insulation part 313.

The plurality of first sensing electrode patterns 314, which are electrically connected to each other through the bridge electrode 311, and the second sensing electrode pattern 315 are formed on the gas blocking layer 312 of covering the insulation part 313. That is, the gas blocking layer 312 blocks the gas generated from the insulation part 313, so that the degradation of optical or electrical property caused in the first sensing electrode patterns 314 and the second sensing electrode pattern 315 due to the gas may be inhibited.

Meanwhile, the gas blocking layer 312 has a thickness of 100 nm or less, such that an electrical short circuit between the first sensing electrode patterns 314 and the bridge electrode 311 is inhibited.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a gas generation layer;
   a sensing electrode pattern on the gas generation layer; and
   a gas blocking layer between the gas generation layer and the sensing electrode pattern to block a gas generated from the gas generation layer,
   wherein the gas generation layer comprises a printed pattern formed on glass.

2. The touch panel of claim 1, wherein the gas generation layer comprises one of PET (polyethylene terephthalate resin), PC (polycarbonate), PMMA (polymethyl methacrylate), TAC (triacetate cellulose) and PES (polyether sulfone).

3. The touch panel of claim 1, wherein the printed pattern comprises an organic material or a mesoporous material.

4. The touch panel of claim 1, wherein the gas blocking layer comprises at least one of ITO (Indium-tin oxide), IZO (Indium Zinc Oxide), ZnO (Zinc Oxide), CNT (carbon nanotube), graphene, and an Ag NW (silver nano-wire).

5. The touch panel of claim 1, the gas blocking layer comprises an oxide material or a nitride material including at least one of Si, Nb, Si, Al, Hf, Zr, TiO, Ta and Zn.

6. The touch panel of claim 1, wherein the gas blocking layer has a thickness of 100 nmor less.

7. A touch panel comprising:
   a substrate,
   a sensing electrode pattern on the substrate and having a plurality of first sensing electrode patterns and second sensing electrode patterns;
   an insulation part inhibiting the first sensing electrode patterns and the second sensing electrode patterns from being electrically shorted;

a gas blocking layer on the insulation part; and
a bridge electrode electrically connecting the first sensing electrode patterns to each other.

8. The touch panel of claim 7, wherein the sensing electrode pattern is closer to the substrate as compared with the insulation part, and the gas blocking layer is formed between the insulation part and the bridge electrode to block gas from the insulation part.

9. The touch panel of claim 7, wherein the insulation part is closer to the substrate as compared with the sensing electrode pattern, the gas blocking layer is formed on the insulation part to block a gas from the insulation part, and the sensing electrode pattern is formed on the gas blocking layer such that the sensing electrode patterns are electrically connected to each other through the bridge electrode.

10. The touch panel of claim 7, wherein the substrate comprises tempered glass, heat strengthened glass, sodalime glass or reinforced plastic.

11. The touch panel of claim 7, wherein the insulation part comprises OCA (Optically Clear Adhesive).

12. The touch panel of claim 8, wherein the gas blocking layer covers the first sensing electrode patterns, the second sensing electrode pattern and the insulation part.

13. The touch panel of claim 8, wherein the gas blocking layer covers the bridge electrode and the insulation part.

* * * * *